United States Patent
Bernard

[15] 3,662,642
[45] May 16, 1972

[54] RETAINING DEVICES

[72] Inventor: James A. Bernard, Dayton, Ohio

[73] Assignee: General Motors Corporation, Detroit, Mich.

[22] Filed: May 18, 1970

[21] Appl. No.: 38,170

[52] U.S. Cl. .............................................................. 85/8.8
[51] Int. Cl. ......................................................... F16b 21/18
[58] Field of Search ............................ 85/8.8; 287/52.07, 108

[56] References Cited

UNITED STATES PATENTS

| | | | |
|---|---|---|---|
| 2,322,138 | 6/1943 | Jenny | 85/8.8 |
| 2,245,751 | 6/1941 | Blackmore | 85/8.8 |
| 2,755,698 | 7/1956 | Wurzel | 85/8.8 |
| 1,620,486 | 3/1927 | O'Bannon | 85/8.8 |
| 2,861,829 | 11/1958 | Johanson et al. | 287/108 |
| 2,491,306 | 12/1949 | Feitl | 85/8.8 |

Primary Examiner—Edward C. Allen
Attorney—Jean L. Carpenter and Arthur N. Krein

[57] ABSTRACT

A retaining device for presenting actual displacement of parts or elements concentrically arranged with respect to one another wherein the retaining device in the form of a split ring, substantially U-shaped in cross section, is provided with an annular split collar or web portion and radially extending split spring rings adapted to be seated in grooves provided in the elements to be held together, one of the spring rings having at least a portion of it bent toward the adjacent spring ring to provide a biasing force when the retaining device is placed in position to hold the two elements together.

3 Claims, 7 Drawing Figures

PATENTED MAY 16 1972          3,662,642

INVENTOR.
James A. Bernard
BY
Arthur N. Krein
ATTORNEY

3,662,642

RETAINING DEVICES

This invention relates to retaining devices and, in particular, to a retaining ring providing artificial shoulders which function to secure one machine part against axial displacement with respect to another machine part, such as a shaft or a bore of a housing.

In the prior art, conventional retaining rings were usually shaped as a single split ring of spring material capable of being spread over the end of a shaft or contracted in the bore of the housing and, upon release, of spring seating itself into a groove provided for its reception in the shaft or the housing.

Both internal and external-type split rings have been used, the internal-type having an outer diameter and the external type having an inner diameter which corresponds approximately so that of the base of the groove in which the respective ring seats, so that such rings fit tight against the bottom of the seating groove throughout their peripheries but without any substantial pressure thereagainst. It has also been known to deform at least portions of these split rings to provide a biasing action against one of the parts with respect to the other parts as they are held in place.

In each of these prior art retaining rings, only a single shoulder was provided and the parts to be held together had to be designed accordingly to take advantage of this single shoulder feature of the prior art retaining ring.

Accordingly, a principal object of the invention is to provide an improved retaining ring whereby the retaining ring is provided with two artificial shoulders which function to secure a machine part against axial displacement with respect to a second machine part.

Another object of this invention is to provide retaining rings of both the so-called external and internal types having multiple shoulders to secure two machine parts together while preventing axial displacement of one of these parts with respect to the other part.

These and other objects of the invention are obtained by means of a split ring-type retaining device of spring steel, the retaining ring being substantially U-shaped in cross section and having its radially extending legs adapted to be seated in grooves provided in the elements to be held together, one of the legs having at least portions thereof bent toward the adjacent legs to provide a biasing force when the legs of this unit are seated in the grooves provided in the elements.

For a better understanding of the invention, as well as other objects and further features thereof, reference is had to the following detailed description of the invention to be read in connection with the accompanying drawings, wherein.

Figure 1:
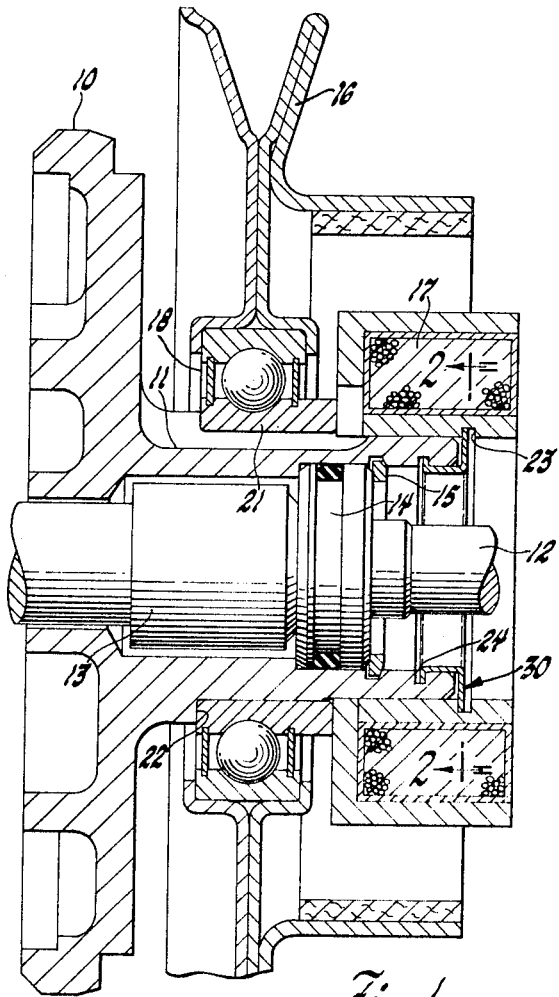
FIG. 1 is a sectional view of the drive shaft end of a refrigerant compressor or the like incorporating therein an internal retainer device of the invention.

Referring now to FIG. 1, there is shown for the purpose of illustration only, the housing 10 of a refrigerant compressor or the like having a bored hub 11 extending from one end thereof and in which a drive shaft 12 is suitably journaled. Shaft 12, which extends outboard of the hub 11, is sealed with respect to the interior of the housing by seals 13 and 14 retained between a shoulder of the shaft and a conventional internal split ring 15 seated in an annular groove provided in the bore of hub 11.

Shaft 12 is driven by pulley 16 through an electromagnetic clutch arrangement, only the coil 17 of which is shown, since the details of this clutch form no part of the subject invention.

Pulley 16 is journaled by bearing 18, the inner race 21 of which is positioned on the outer periphery of hub 11 with one end of the inner race butter against shoulder 22 of the housing 10. Coil 17, mounted on housing 10 adjacent to pulley 16 and against the opposite end of inner race 21 from shoulder 22 is held in position by an internal retainer, generally designated 30, in accordance with the invention, which is provided with legs in the form of split rings seated in inner groove 23 provided on the internal diameter of coil 17 and groove 24 in the bore of hub 11.

Figure 2:
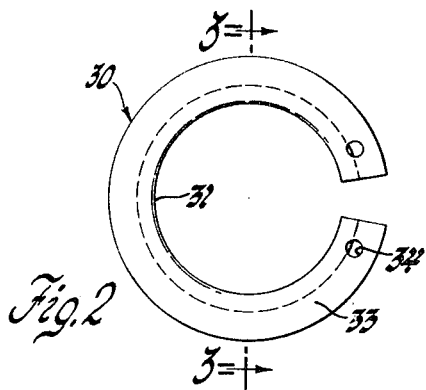
FIG. 2 is a plan view of the internal retainer device of FIG. 1.
Figures 3, 4:
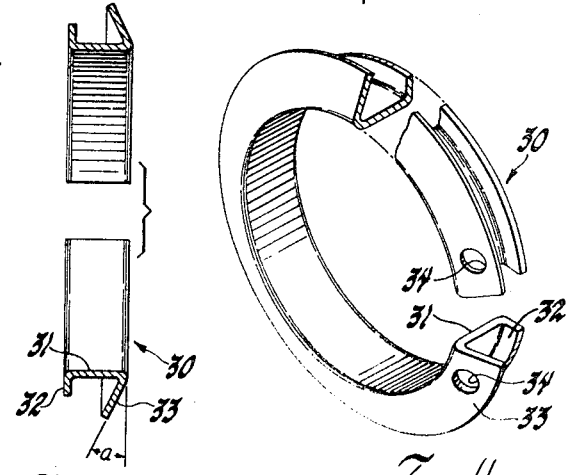
FIG. 3 is a sectional view of the internal retainer device taken along line 3—3 of FIG. 2.
FIG. 4 is an axiometric view of the internal retainer of FIG. 2.
Figure 7:
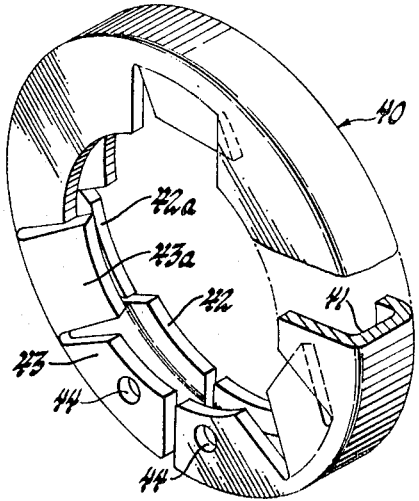
FIG. 7 is an axiometric view of the external retaining device.

As shown more clearly in FIGS. 2, 3 and 4, the internal retainer 30, made, for example, of spring steel or other suitable material, in the form of a split ring substantially U-shaped in cross section and includes a split annular collar or web portion 31 and radially outwardly extending split rings 32 and 33 forming the legs of the U-shaped structure. In the embodiment shown, ring 32 is formed substantially normal to web portion 31 and extends radially outward therefrom, whereas ring 32 extends radially outward at a suitable acute angle $\alpha$ from the normal with respect to the web portion, such as 20°, so that it is inclined toward ring 32 for a purpose to be described. Alternately, ring 32 can be formed normal to web portion 31 and provided, if desired, with bent over tab portions which are inclined toward ring 32 in a manner similar to that shown in FIG. 7 illustrating an external retainer constructed in accordance with the invention.

Initially, in its free state, as seen in FIG. 2 or 4, the web portion 31 has an external diameter less than the internal bore diameter of hub 11, while ring 32 has an external diameter approximate to that of the base of groove 24 and ring 33 has an external diameter approximate to that of the base of groove 23 so that these rings fit tight against the bottom of the seating grooves throughout their peripheries but without any substantial pressure thereagainst. The free ends of ring 33 are preferably provided with apertures 34 for receiving the points of a plier-like tool, not shown, by which the retainer may be squeezed to reduce the effective outside diameter of rings 32 and 33 to slide them into their respective grooves 24, 23 within the bores of hub 11 and coil 17, respectively. The grooves 24 and 23 are preferably formed sufficiently wider than the thickness of rings 32 and 33 to permit easy entry of these rings into their respective grooves.

Referring again to FIG. 1, which shows the retainer 30 in its assembled position with respect to hub 11 in coil 17, the ring 33, which is normally bent toward ring 32, is in the assembled position now substantially normal to web 31 and, in this position, biases the coil 17 to the left as seen in this figure into contact with the inner race 21 to force it against shoulder 22 of housing 10 and, of course, preventing axial movement of the coil 17 to the right with respect to hub 11.

Figures 5, 6:
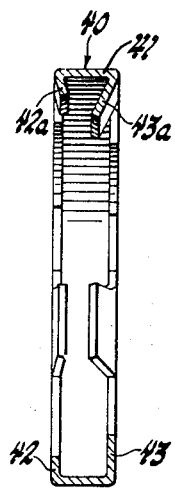
FIG. 5 is a sectional view of a refrigerant compressor housing utilizing an external retainer device according to the invention.
FIG. 6 is a sectional view of the external retainer device of FIG. 5.

In the embodiment of the invention shown in FIG. 5, an external retainer, generally designated 40, is used to retain a seal 14a against the shoulder 25 of refrigerant compressor housing 10a, the seal 14a encircling drive shaft 12a suitably journaled within the housing.

Referring now to FIGS. 6 and 7, the external retainer 40 is similar in construction to the internal retainer 30 except that the rings thereof extend radially inward instead of radially outward as in the internal retainer 30. As shown, the external retainer 40, also made of suitable material such as spring steel, is in the form of a split ring substantially U-shaped in cross section and includes a split annular collar or web portion 41 and radially inwardly extending split rings 42 and 43. Although it is to be understood that one of the rings, for example, ring 32, can be formed substantially normal to the web portion 41 while the ring 43 can extend radially inward at a suitable angle toward the ring 32, in a manner similar to the arrangement shown for the internal retainer in FIG. 3, in the embodiment disclosed, both rings 42 and 43 are throughout most of their area formed normal to the web portion 41. However, rings 42 and 43 are provided with bent over tab portions 42a and 43a, three being shown for each ring, that are inclined toward each other to provide a biasing action against each of the elements with which they cooperate, as described in detail hereinafter.

Initially, in its free state, as seen in FIG. 7, the rings 42 and 43 are of nearly closed construction and the ring 42 has an internal diameter approximate to that of the base of groove 45 in hub 11a of the housing 10a while the ring 43 has an internal diameter approximate to that of the base of groove 46 in seal 14a so that these rings sit tight against the bottom of the seating grooves but without any substantial pressure thereagainst.

The free ends of rings 43 are preferably provided with apertures 44 for receiving the points of a plier-like tool, not shown, by which this retainer may be spread to enlarge the perspective inside diameter of rings 42 and 43 to permit them to slide over the step portion of hub 11a and the outside diameter of seal 14a so that the retainer rings can slide into the respective grooves 45 and 46 in these elements.

Referring now to FIG. 5, which shows the external retainer 40 in its assembled position, the tab portions 42a and 43a of rings 42 and 43, respectively, are now substantially normal to the web portion 41 and act to force the seal 14a to the left as seen in this figure into engagement with the shoulder 45 in housing 10a while at the same time preventing movement of the seal 14a to the right as seen in this same figure.

From the description of the retaining devices of the invention, it is apparent that these retainers are adapted to provide artificial shoulders which function to secure one machine part against axial displacement with respect to another machine part and to provide, as desired, an axial biasing force relative to these parts by forming one or both radial extending rings, or tab portions thereof, inclined at the desired angle with respect to the annular collar of the retainer.

What is claimed is:

1. A retaining ring adapted to be sprung into grooves provided in two machine elements to form artificial shoulder means for securing these machine elements against axial displacements relative to each other, said retaining ring comprising a split ring substantially U-shaped in cross section and including a split annular web portion, a first radially extending annular split ring integral with one edge of said web portion and a second radially extending annular split ring integral with the other edge of said web portion, said split rings having substantially equal diameters at their point of junction with said web portion, the diameter of the free edge of said first split ring being less than the diameter of the free edge of said second split ring, at least one of said split rings having at least portions thereof at an acute angle to the normal with respect to said web portion and inclined toward the other one of said split rings.

2. A retaining ring according to claim 1 wherein said first split ring and said second split ring extend radially outward from said web portion.

3. A retaining ring according to claim 1 wherein said first split ring and said second split ring extend radially inward from said web portion.

* * * * *